(12) United States Patent
Wan et al.

(10) Patent No.: US 12,064,689 B2
(45) Date of Patent: Aug. 20, 2024

(54) METHOD FOR SELECTING VIRTUAL OBJECTS, APPARATUS, TERMINAL AND STORAGE MEDIUM

(71) Applicant: TENCENT TECHNOLOGY (SHENZHEN) COMPANY LIMITED, Shenzhen (CN)

(72) Inventors: Yulin Wan, Shenzhen (CN); Xun Hu, Shenzhen (CN); Jianmiao Weng, Shenzhen (CN); Shandong Su, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 207 days.

(21) Appl. No.: 17/494,624

(22) Filed: Oct. 5, 2021

(65) Prior Publication Data
US 2022/0032188 A1 Feb. 3, 2022

Related U.S. Application Data

(63) Continuation of application No. PCT/CN2021/083725, filed on Mar. 30, 2021.

(30) Foreign Application Priority Data

May 12, 2020 (CN) .......................... 202010398569.3

(51) Int. Cl.
*A63F 13/525* (2014.01)
*A63F 13/426* (2014.01)
*G06F 3/04842* (2022.01)

(52) U.S. Cl.
CPC .......... *A63F 13/525* (2014.09); *A63F 13/426* (2014.09); *G06F 3/04842* (2013.01)

(58) Field of Classification Search
None
See application file for complete search history.

(56) References Cited

U.S. PATENT DOCUMENTS 6,409,604 B1 6/2002 Matsuno
10,444,871 B2 10/2019 Wang
(Continued)

FOREIGN PATENT DOCUMENTS

EP 2368613 A2 9/2011
JP 2006155442 A 6/2006
(Continued)

OTHER PUBLICATIONS

The European Patent Office (EPO) The Extended European Search Report for 217725005.9 May 10, 2023 4 Pages (including translation).

(Continued)

*Primary Examiner* — Jason T Yen
(74) *Attorney, Agent, or Firm* — ANOVA LAW GROUP, PLLC

(57) ABSTRACT

A method is provided for selecting a virtual object on a user terminal of a terminal. The method is performed by the terminal and includes: displaying the user interface; obtaining a predefined execution area of a first operation of a first virtual object within a virtual environment; obtaining a visible boundary scope of the virtual environment; determining, based on the predefined execution area and the visible boundary scope, an effective execution area of the first operation within the virtual environment; and determining, based on the effective execution area, a target virtual object.

20 Claims, 11 Drawing Sheets

(56) References Cited

U.S. PATENT DOCUMENTS

| | | | |
|---|---|---|---|
| 10,639,549 | B2 | 5/2020 | Tang et al. |
| 2004/0095344 | A1 | 5/2004 | Dojyun et al. |
| 2012/0142414 | A1* | 6/2012 | Murakami ............ G06F 3/0488 |
| | | | 463/32 |
| 2013/0079133 | A1* | 3/2013 | Yamada ................ A63F 13/573 |
| | | | 463/31 |
| 2017/0109019 | A1* | 4/2017 | Lei ...................... G06F 3/04842 |
| 2018/0137678 | A1 | 5/2018 | Kaehler |
| 2018/0361248 | A1* | 12/2018 | Nomura ................ A63F 13/847 |
| 2018/0369693 | A1* | 12/2018 | Rong ...................... A63F 13/92 |
| 2019/0073109 | A1* | 3/2019 | Zhang ..................... G06F 3/013 |

FOREIGN PATENT DOCUMENTS

| | | |
|---|---|---|
| JP | 2008307387 A | 12/2008 |
| JP | 2012100314 A | 5/2012 |
| JP | 2015226767 A | 12/2015 |
| JP | 2018057463 A | 4/2018 |
| KR | 20170137913 A | 12/2017 |
| KR | 20180005222 A | 1/2018 |

OTHER PUBLICATIONS

Korean Intellectual Property Office (KIPO) Office Action 1 for 520050388561 Jun. 21, 2023 15 Pages (including translation).
The World Intellectual Property Organization (WIPO) International Search Report for PCT/CN2021/083725 Aug. 12, 2021 5 Pages (including translation).
Anonymous, "How to find world coordinates of screen corners with a camera angle," Unity Answers, Jul. 3, 2013 (Jul. 3, 2013), Retrieved from the Internet:URL: https://answers.unity.com/questions/486035/how-to-find-world-of-screen-corners-wi.html. 3 pages.
The Japan Patent Office (JPO) Notification of Reasons for Refusal for Application No. 2021-564930 and Translation Dec. 16, 2022 7 Pages.

* cited by examiner

METHOD FOR SELECTING VIRTUAL OBJECTS, APPARATUS, TERMINAL AND STORAGE MEDIUM

RELATED APPLICATION(S)

This application is a continuation application of PCT Patent Application No. PCT/CN2021/083725, filed on Mar. 30, 2021, which claims the benefit of Chinese Patent Application, No. 202010398569.3, entitled "Method for Selecting Virtual Objects, Apparatus, Terminal and Storage medium", filed on May 12, 2020, the entire contents of all of which are hereby incorporated by reference in entirety.

FIELD OF THE TECHNOLOGY

The present disclosure relates to computer and Internet technologies, and more particularly, to a method for selecting virtual objects, an apparatus, a terminal and a storage medium.

BACKGROUND

Different types of skills of virtual objects are employed in game applications.

In a game, a user may control a first virtual object to use skills to attack a second virtual object, in which the second virtual object and the first virtual object are in different camps. When the first virtual object releases a skill, a client may obtain an attack scope of the skill, and takes the second virtual object within the attack scope as an attack target of the first virtual object.

However, the selected attack target may be not displayed on a terminal display, which is inconsistent with the user's situation, resulting in a low accuracy in the selection of attack targets.

SUMMARY

Embodiments of the present disclosure provide a method for selecting virtual objects on a user interface of a terminal, an apparatus, the terminal and a storage medium, which may ensure that the action target of the first operation is within the user's visual scope, and the accuracy for selecting the action target of the first operation is improved.

In one aspect, the present disclosure provides a method for selecting a virtual object on a user interface of a terminal, performed by the terminal, including: displaying a user interface, wherein the user interface includes a display screen corresponding to a virtual environment, and further includes a first virtual object located in the virtual environment; obtaining a predefined execution area of a first operation of the first virtual object within the virtual environment; obtaining a visible boundary scope of the virtual environment, wherein virtual objects that reside in the visible boundary scope are visible on the user interface; determining, based on the predefined execution area and the visible boundary scope, an effective execution area of the first operation within the virtual environment; and, determining, based on the effective execution area, a target virtual object.

In another aspect, the present disclosure provides an apparatus for selecting a virtual object on a user interface of a terminal, the apparatus includes a memory storing computer program instructions; and a processor coupled to the memory and configured to execute the computer program instructions and perform: displaying the user interface, wherein the user interface includes a display screen corresponding to a virtual environment, and further includes a first virtual object located in the virtual environment; obtaining a predefined execution area of a first operation of the first virtual object within the virtual environment; obtaining a visible boundary scope of the virtual environment, wherein virtual objects that reside in the visible boundary scope are visible on the user interface; determining, based on the predefined execution area and the visible boundary scope, an effective execution area of the first operation within the virtual environment; and determining, based on the effective execution area, a target virtual object.

In yet another aspect, the present disclosure provides a non-transitory computer-readable storage medium storing computer program instructions executable by at least one processor to perform: displaying a user interface of a terminal, wherein the user interface includes a display screen corresponding to a virtual environment, and further includes a first virtual object located in the virtual environment; obtaining a predefined execution area of a first operation of the first virtual object within the virtual environment; obtaining a visible boundary scope of the virtual environment, wherein virtual objects that reside in the visible boundary scope are visible on the user interface; determining, based on the predefined execution area and the visible boundary scope, an effective execution area of the first operation within the virtual environment; and determining, based on the effective execution area, a target virtual object.

Other aspects of the present disclosure can be understood by those skilled in the art in light of the description, the claims, and the drawings of the present disclosure.

BRIEF DESCRIPTION OF THE DRAWINGS

To facilitate a better understanding of technical solutions of certain embodiments of the present disclosure, accompanying drawings are described below. The accompanying drawings are illustrative of certain embodiments of the present disclosure, and a person of ordinary skill in the art may still derive other drawings from these accompanying drawings without having to exert creative efforts. When the following descriptions are made with reference to the accompanying drawings, unless otherwise indicated, same numbers in different accompanying drawings may represent same or similar elements. In addition, the accompanying drawings are not necessarily drawn to scale.

DETAILED DESCRIPTION

To make objectives, technical solutions, and/or advantages of the present disclosure more comprehensible, certain embodiments of the present disclosure are further elaborated in detail with reference to the accompanying drawings. The embodiments as described are not to be construed as a limitation to the present disclosure. All other embodiments obtained by a person of ordinary skill in the art without creative efforts shall fall within the protection scope of embodiments of the present disclosure.

Throughout the description, and when applicable, "some embodiments" or "certain embodiments" describe subsets of all possible embodiments, but it may be understood that the "some embodiments" or "certain embodiments" may be the same subset or different subsets of all the possible embodiments, and can be combined with each other without conflict.

In certain embodiments, the term "based on" is employed herein interchangeably with the term "according to."

Figure 1:
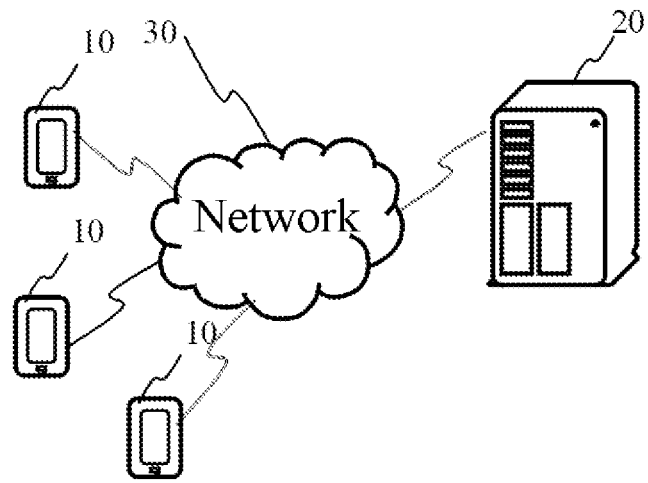
FIG. 1 is a schematic diagram illustrating a running environment of an application, in accordance with one or more embodiments of the present disclosure.

FIG. 1 is a schematic diagram illustrating a running environment of an application, in accordance with an embodiment of the present disclosure. The application running environment may include a terminal 10 and a server 20.

The terminal 10 may be electronic equipment (UE), such as a mobile phone, a tablet computer, a game host, an E-book reader, Multimedia playback equipment, a Wearable Device, a Personal Computer (PC). A client of an application may be installed to the terminal 10.

The application may be any application that can provide a virtual environment, such that a virtual object selected and operated by a user performs activities within the virtual environment. In certain embodiments, the application is a game application, such as, Multiplayer Online Battle Arena (MOBA) game, Battle Royale (BR) game, Third-Personal Shooting Game (TPS), First-Person Shooting Game (FPS) and Multiplayer gun battle survival game. In addition to game applications, other types of applications may also display a virtual object for users, and provide a corresponding function for the virtual object, e.g., Virtual Reality (VR) applications, Augmented Reality (AR) applications, three-dimensional map programs, military simulation programs, social applications, interactive entertainment applications, and so on, which are not limited by embodiments of the present disclosure. In addition, for a different application, the form and corresponding function of a virtual object provided will be different, which may be configured or pre-configured according to what may be desirable, and are not limited by embodiments of the present disclosure. A client of foregoing application runs on the terminal 10. In some embodiments, foregoing application is developed based on a three-dimensional virtual environment engine, e.g., such virtual environment engine is Unity engine. The virtual environment engine may build a third-dimensional virtual environment, a virtual object and virtual props, and so on, which bring users a more immersive gaming experience.

The virtual environment is a scene, which is displayed (or provided) by a client of an application (e.g., a game application), when the client runs on the terminal. Such virtual environment refers to a scene created for virtual objects to perform activities (such as game competition), such as virtual houses, virtual islands, virtual maps, and virtual buildings, and so on. Such virtual environment may be a simulation environment of the real world, a semi-simulation and semi-fictional environment, or a purely fictional environment. The virtual environment may be a two-dimensional virtual environment, or a 2.5-dimensional virtual environment, or a three-dimensional virtual environment, which are not limited by embodiments of the present disclosure.

The virtual object may be a virtual character controlled by a user account in the application, or may be a virtual character controlled by a computer program in the application. In an example, where the application is a game application, the virtual object may be a game character controlled by a user account in the game application, or may be a game monster controlled by a computer program in the game application. A virtual object may be a character form, an animal, a cartoon, or other form, which is not limited in the embodiments of the present disclosure. The virtual object may be displayed in a three-dimensional form or a two-dimensional form, which is not limited in the embodiments of the present disclosure. When the virtual environment is a three-dimensional environment, the virtual object is a three-dimensional model created based on animation skeletal technology. In the three-dimensional environment, each virtual object has its own shape and volume, and occupies a part of the space in the three-dimensional virtual environment. In the embodiments of the present disclosure, the terminal 10 may receive an operation from a virtual object, determine an effective execution area, based on a predefined execution area of the operation and a visible boundary scope of the virtual environment, and then, determine a target virtual object corresponding to the operation in the effective execution area.

In certain embodiments, the virtual objects include virtual objects in the same camp and virtual objects in different camps. That is, in the application, virtual objects are divided into different camps. Illustratively, taking the MOBA game as an example, ten users play a matching game and are divided into two teams, i.e., the red team and the blue team. That is, every 5 people are in a group. At this time, virtual objects of the red team are in the same camp and are teammates, and virtual objects of the blue team are in the same camp and are teammates. However, virtual objects of the red team and virtual objects of the blue team are in different camps, and are hostile to each other.

The server 20 is configured to provide background services for a client of an application in the terminal 10. For example, the server 20 may be a background server of foregoing application. The server 20 may be a server, or a server cluster composed of multiple servers, or a cloud computing service center. The server 20 may simultaneously provide background services for applications of various terminals 10.

The terminal 10 and the server 20 may communicate with each other through a network 30.

Figure 2:
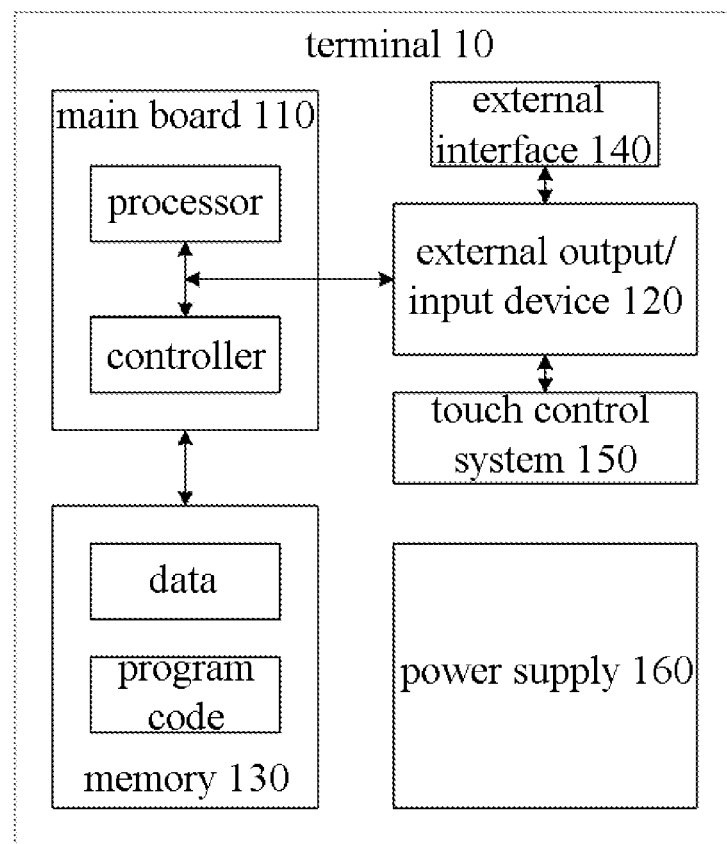
FIG. 2 is a schematic diagram illustrating structure of a terminal, in accordance with one or more embodiments of the present disclosure.

FIG. 2 is a schematic diagram illustrating structure of a terminal, in accordance with an embodiment of the present disclosure. The terminal 10 may include a main board 110, an external output/input device 120, a memory 130, an external interface 140, a touch control system 150 and a power supply 160.

The main board 110 integrates processing elements such as a processor and a controller.

For the terminal, the external output/input device 120 may include a display component (such as a display), a sound playback component (such as a speaker), a sound collection component (such as a microphone), all kinds of buttons, and so on. For a PC terminal, the external output/input device 120 may include a display component (such as a display), a sound playback component (such as a speaker), a sound collection component (such as a microphone), all kinds of buttons (such as mouse and keyboard), and so on.

The memory 130 stores program codes and data.

The external interface 140 may include a headphone interface, a charging interface, a data interface, and so on.

The touch control system 150 may be integrated into the display component, or button of the external output/input device 120. The touch control system 150 is configured to detect a touch control operation performed by a user on the display component or button.

The power supply 160 is configured to provide power for other components in the terminal 10.

In the embodiments of the present disclosure, the processor in the main board 110 may generate a user interface (e.g., game interface), by executing or calling program codes or data in the memory, and display the generated user interface (e.g., game interface) through the external output/input device 120. During the process of displaying the user interface (e.g., game interface), a touch operation executed when a user interacts with a user interface (e.g., game interface) may be detected through the touch control system 150, and a response to the touch control operation may be made through the touch control system 150.

Figure 3:
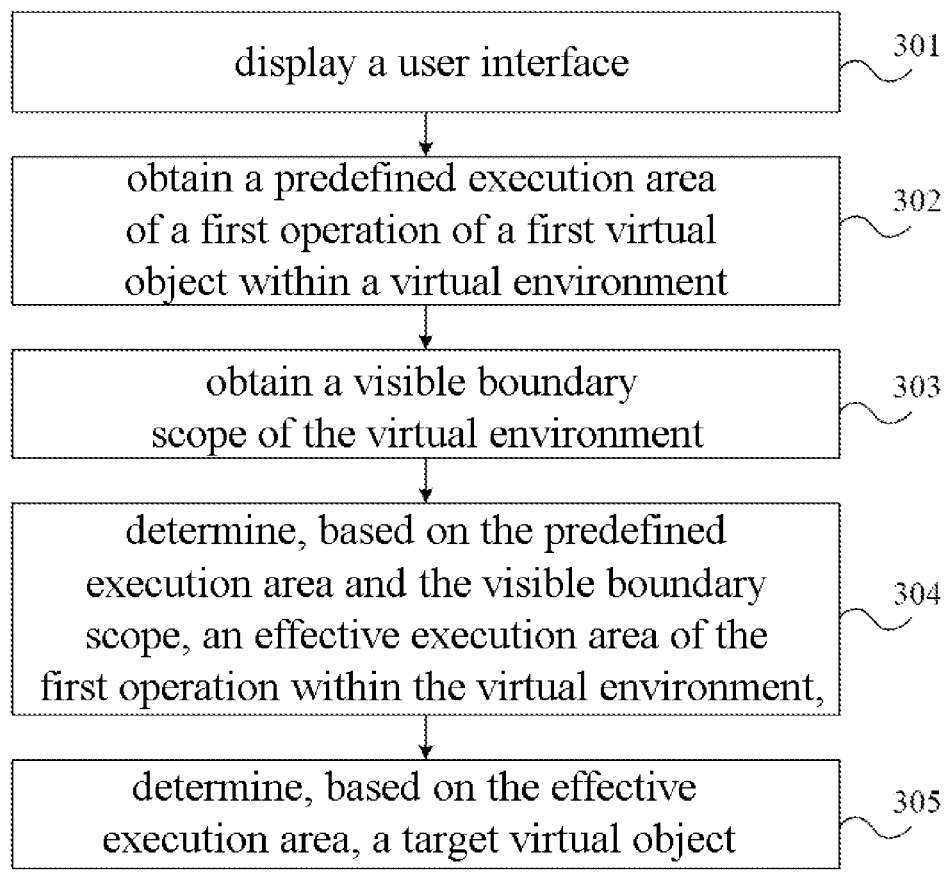
FIG. 3 is a schematic flowchart illustrating a method for selecting a virtual object on a user interface of a terminal, in accordance with one or more embodiments of the present disclosure.

FIG. 3 is a flowchart illustrating a method for selecting a virtual object on a user interface of a terminal, in accordance with an embodiment of the present disclosure. The method may be applied to the terminal, e.g., an execution entity of each block may be the terminal 10 (referred to as "client" hereinafter) in the application running environment shown in FIG. 1. The method may include the following blocks (301~305).

In block 301, display a user interface.

The user interface may be a picture of an application displayed for a user by a client. The application may be a computer program to be downloaded and installed, and may be a click-to-run computer program. Foregoing application may be any application that may provide a virtual environment, e.g., a game application program. The user interface includes a display screen of the virtual environment. The display screen may include virtual items, e.g., a virtual building, a virtual environment, a virtual map, and so on. The user may control a first virtual object to interact with various virtual items within the virtual environment.

In the embodiments of the present disclosure, when receiving an instruction for triggering application launch from a user, the client may also control the running of the application, and display the user interface corresponding to the application. The user interface includes a display screen corresponding to the virtual environment, and further includes a first virtual object located in the virtual environment. The first virtual object may be a virtual object controlled by the user.

In block 302, obtain a predefined execution area of a first operation of the first virtual object within the virtual environment.

The first virtual object is a virtual character controlled by foregoing user within the virtual environment. The first virtual object may be in the form of a character, an animal, a cartoon, or other forms, which are not limited by the embodiments of the present disclosure. In the embodiments of the present disclosure, the first virtual object may be displayed in three-dimensional or two-dimensional form.

The first operation refers to any interactive operation between the first virtual object and foregoing virtual environment, e.g., the first operation is a skill release operation of the first virtual object, or an ordinary attack operation of the first virtual object. The action target of the interactive operation may be a virtual item within the virtual environment, or other virtual objects of the virtual environment, which are not limited by the embodiments of the present disclosure.

In certain embodiments, foregoing first operation is triggered by the first virtual object, which is controlled by the user. The user may start the trigger instruction of the first operation, by clicking a corresponding icon or pressing a corresponding key. Furthermore, after receiving the trigger instruction, the client may control the first virtual object to perform foregoing first operation.

In certain embodiments, foregoing first operation is trigged by the first virtual object, which is controlled by the computer program. After running foregoing application, the client may control the first virtual object to perform foregoing first operation, according to a preset criteria. The preset criteria may be set flexibly. For example, foregoing preset criteria includes online duration of the first virtual object. The client may detect the online duration of the first virtual object. When the online duration of the first virtual object meets a requirement, the client may control the first virtual object to perform foregoing first operation. For another example, foregoing preset criteria includes attribute parameters of the first virtual object, the client may detect the attribute parameters of the first virtual object. When the one or more attribute parameters of the first virtual object meets a requirement, the client controls the first virtual object to perform foregoing first operation. The attribute parameters may include a life value, a defense value, or an attack speed, and so on, which are not limited by the embodiments of the present disclosure. Alternatively, foregoing preset criteria includes operation parameters of the first virtual object, and the client may detect the operation parameters of the first virtual object. When the operation parameters of the first virtual object meet a requirement, the client controls the first virtual object to perform foregoing first operation. Foregoing operation parameters may be number of monsters defeated, number of skill released, number of items used, and so on, which are not limited by the embodiments of the present disclosure. It should be noted that, foregoing introduction to the preset criteria is only exemplary and explanatory. In practical implementations, foregoing preset criteria may be flexibly set according to actual situations.

The predefined execution area refers to an action scope of foregoing first operation. A different first operation may correspond to a different predefined execution area. In the embodiments of the present disclosure, after displaying foregoing user interface, the client may obtain the predefined execution area of the first operation of the first virtual object within the virtual environment. The shape of the predefined execution area may be circle, rectangle, or triangle, and so on, which are not limited by the embodiments of the present disclosure.

In certain embodiments, foregoing predefined execution area is a preset scope. The preset scope is set by a designer, which is not changed during the running of the application. In certain embodiments, foregoing predefined execution area is a requirement scope. The requirement scope changes according to different requirements during the running of the application, e.g., the predefined execution area of the first operation may be proportional or inversely proportional to the number of executions of the first operation, etc. In actual implementations, foregoing requirement may be set flexibly according to actual situations, which are not limited by the embodiments of the present disclosure.

In the embodiments of the present disclosure, the client may obtain foregoing predefined execution area, according to location information of the first virtual object. Foregoing block 302 may include several blocks as follows.

1. Obtain location information of the first virtual object within the virtual environment.

2. Determine the predefined execution area of the first operation within the virtual environment, based on the location information and a predefined execution distance of the first operation.

The location information is configured to indicate the location of the virtual object within the virtual environment. The location information is represented in the form of coordinates.

The predefined execution distance refers to the maximum action distance of foregoing first operation. Within the virtual environment, a virtual item or virtual object, distance to the first virtual object is less than the maximum action distance, may be taken as the action target of the first operation. In the embodiments of the present disclosure, the client may obtain the location information of foregoing first virtual object, and determine the predefined execution area of the first operation, based on the location information and the predefined execution distance of the first operation. The client may determine boundary points of the predefined execution area, based on the location information and the predefined execution distance of the first operation, and then determine the predefined execution area. Alternatively, the client may also determine each area point within the predefined execution area, based on the location information and the predefined execution distance of the first operation, and then determine the predefined execution area, which are not limited by the embodiments of the present disclosure. The same first operation may possess one or more predefined execution distances.

In certain embodiments, the first operation has one predefined execution distance. At this time, the predefined execution area is a circle scope centered on the first virtual object. The distance between a boundary point of the predefined execution area and the first virtual object is the same. When obtaining the predefined execution area of the first operation, the client may firstly obtain the location information of the first virtual object and the predefined execution distance of the first operation, determine area points within the virtual environment, in which the distance between an area point and the first virtual object is less than, or equal to the predefined execution distance. A scope consisting of the area points is the predefined execution area of the first operation.

In certain embodiments, the first operation has multiple predefined execution distances. At this time, the distance between a boundary point of the predefined execution area and the first virtual object is not equal. When obtaining the predefined execution area, the client may firstly obtain the location information of the first virtual object and multiple predefined execution distances of the first operation. The client may take the standing direction of the first virtual object as a reference, determine area points within the virtual environment from various directions of the virtual environment, based on the location information, in which the distance between an area point and the first virtual object is less than, or equal to a corresponding predefined execution distance. A scope consisting of the area points is the predefined execution area of the first operation. The standing direction of the first virtual object may be the real-time moving direction of the first virtual object.

Figure 4:
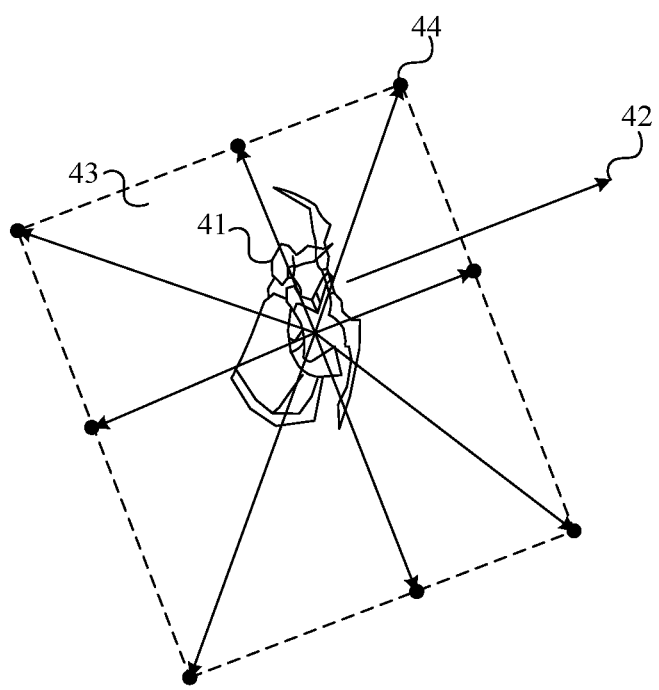
FIG. 4 is a schematic diagram illustrating how to obtain a predefined execution area, in accordance with one or more embodiments of the present disclosure.

In an example, where the predefined execution area is a rectangle, in conjunction with FIG. 4, in the virtual environment, the standing direction of the first virtual object 41 is a first direction 42. When obtaining the predefined execution area 43 of the first operation, the client may obtain the location information of the first virtual object 41 and multiple predefined execution distances of the first operation, take the first direction 42 as a reference, obtain multiple boundary points 44 of the predefined execution area, and then, determine the predefined execution area 43 of the first operation.

It should be noted that, in the embodiments of the present disclosure, after displaying a user interface, the client may obtain the predefined execution area of the first operation in real time, and update the predefined execution area, based on the change of the location information of the first virtual object. Alternatively, after receiving the trigger instruction of the first operation, the client may obtain the predefined execution area of the first operation, which is not limited by the embodiments of the present disclosure.

In block 303, obtain a visible boundary scope of the virtual environment.

The visible boundary scope refers to a display scope of the user interface. The display scope may be a scope obtained by the virtual camera from the virtual environment. That is, the virtual environment in foregoing visible boundary scope is visible on the user interface, e.g., virtual objects that reside in the visible boundary scope are visible on the user interface. In the embodiments of the present disclosure, the client may determine a display scope of the virtual camera, based on screen scope of the client, and then, obtain the visible boundary scope of the virtual environment.

Figure 5:
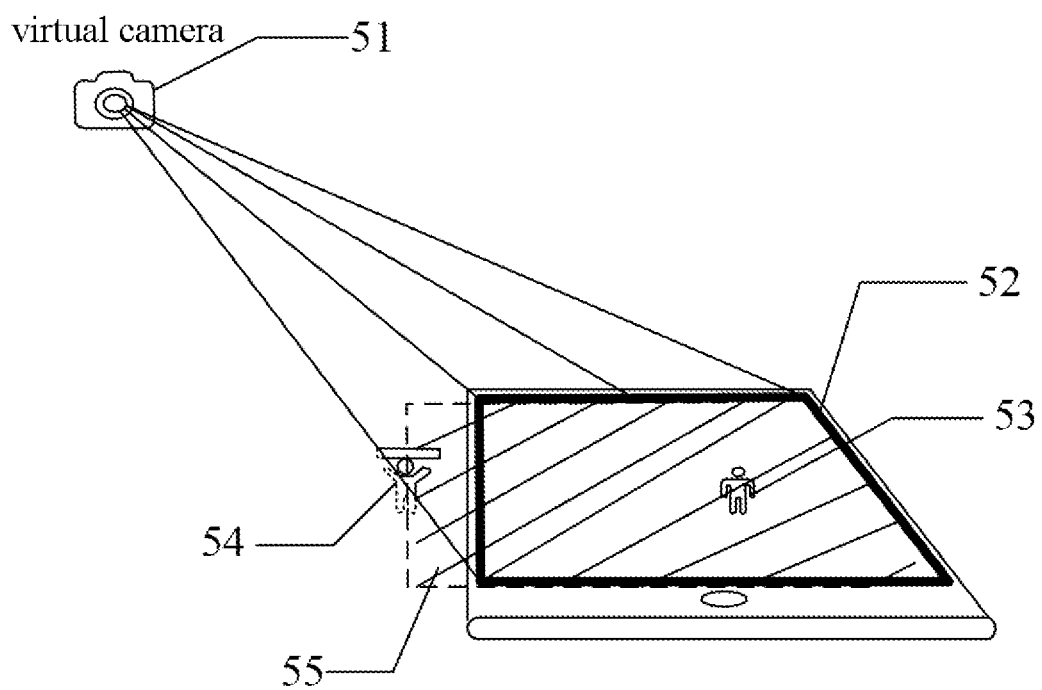
FIG. 5 is a schematic diagram illustrating how to display a visible boundary scope, in accordance with one or more embodiments of the present disclosure.

Due to the shooting angle of the virtual camera, the visible boundary scope is not the same as the screen scope of the client. Exemplarily, in conjunction with FIG. 5, a virtual camera 51 may obtain virtual items in a virtual environment, and map the virtual items to a screen scope 52 of the client. Due to the shooting angle of the virtual camera 51, a first virtual object 53 and a solid line portion of a second virtual object 54 may be displayed in the screen scope 52. That is, a dashed scope 55 (i.e., slash coverage area) in FIG. 5 is the visible boundary scope.

It should be noted that, the embodiments of the present disclosure do not limit the chronological order between the block of obtaining the predefined execution area by the client, and the block of obtaining the visible boundary scope by the client. The client may firstly obtain the predefined execution area, and then, obtain the visible boundary scope. Alternatively, the client may firstly obtain the visible boundary scope, and then, obtain the predefined execution area. The client may also simultaneously obtain the predefined execution area and the visible boundary scope, which are not limited by the embodiments of the present disclosure.

In block 304, determine, based on the predefined execution area and visible boundary scope, an effective execution area of the first operation in the virtual environment.

The effective execution area refers to an action scope of the first operation in an actual operation process. The effective action scope includes the action target of the first operation. The first operation may only affect virtual items, or virtual objects within the effective execution area of the virtual environment, and may not affect virtual items, or virtual objects outside the effective execution area. After obtaining the predefined execution area of foregoing first operation and the visible boundary scope of the virtual environment, the client may determine, based on the predefined execution area and the visible boundary scope, the effective execution area of the first operation in the virtual environment.

Figure 6:
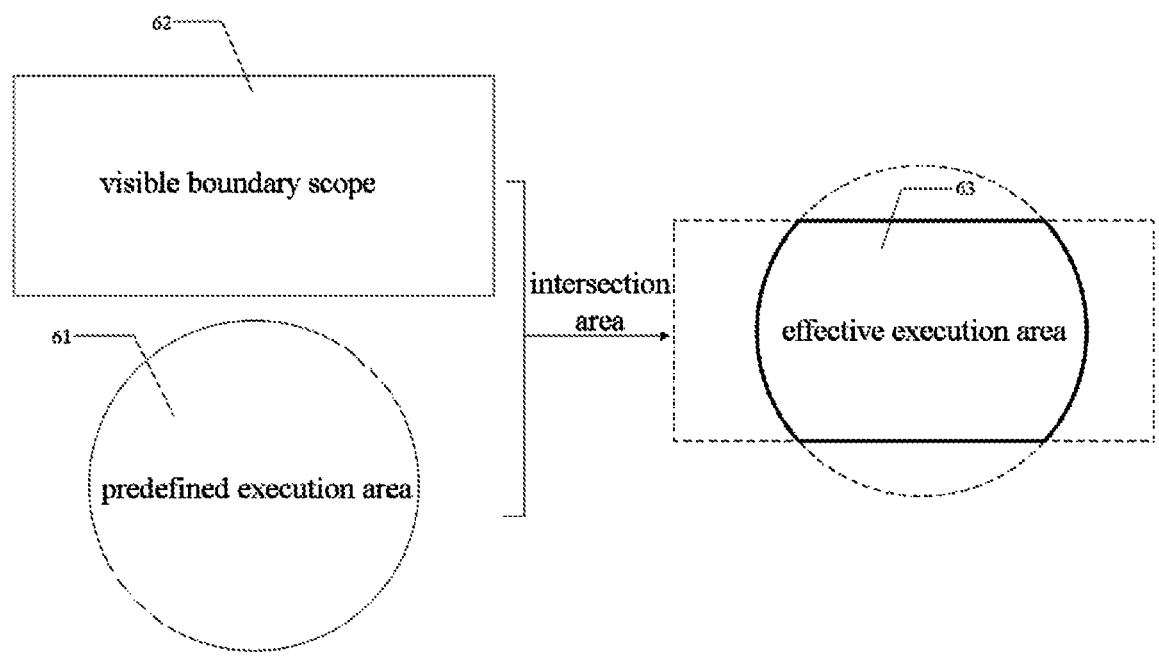
FIG. 6 is a schematic diagram illustrating how to obtain an effective execution area, in accordance with one or more embodiments of the present disclosure.

In the embodiments of the present disclosure, the client may identify the intersection area of the predefined execution area and the visible boundary scope as the effective execution area of the first operation in the virtual environment. Exemplarily, in conjunction with FIG. 6, a predefined execution area 61 of the first operation is a circle scope. A visible boundary scope 62 of the virtual environment is a rectangle scope. The client identifies an intersection area (solid-line scope area) of the predefined execution area 61 and the visible boundary scope 62 as the effective execution area of the first operation.

In block 305, determine, based on the effective execution area, a target virtual object.

The target virtual object refers to the action object of foregoing first operation.

In the embodiments of the present disclosure, after obtaining foregoing effective execution area, the client may determine the target virtual object corresponding to the first operation, based on the effective execution area.

In certain embodiments, in order to reduce the response duration of the first operation and improve users' execution experience, after displaying the user interface, the client may obtain the effective execution area of the first operation in real time, determine the target virtual object corresponding to the first operation based on the effective execution area, and update foregoing effective execution area and the target virtual object. Subsequently, after receiving the trigger instruction of foregoing first operation, the client may quickly determine the target virtual object corresponding to the first operation, and control the first virtual object to perform the first operation.

In certain embodiments, in order to reduce processing overhead of a terminal, after obtaining the trigger instruction of the first operation, the client may obtain the effective execution area of the first operation, based on the trigger instruction of the first operation, determine the target virtual object corresponding to the first operation based on the effective execution area, and then, control the first virtual object to perform the first operation.

In view of above, in the technical solutions provided by the embodiments of the present disclosure, the effective execution area of the first operation is determined, based on the predefined execution area of the first operation and the visible boundary scope of the virtual environment. The target virtual object corresponding to the first operation is determined, based on the effective execution area, such that the target virtual object is located in the visible boundary scope, thereby guaranteeing that the action object of the first operation is within the visible scope of the user, avoiding an operation misjudgment resulted from the following scene, i.e., the action object is within an invisible scope of the user, and improving the accuracy for selecting the action target of the first operation.

In addition, identify the intersection area of the predefined execution area and the visible boundary scope as the effective execution area of the first operation, thereby effectively ensuring that the action target of the first operation is not only in the execution area of the first operation, but also in the visible scope of the user.

The obtaining of the visible boundary scope is introduced in the following. In an exemplary embodiment, foregoing block 303 includes the following blocks.

Process a three-dimensional visual representation in the virtual environment, and obtain a two-dimensional visual representation of the virtual environment by the processing of the three-dimensional visual representation.

The three-dimensional visual representation refers to a running visual representation of the virtual environment. In the running visual representation, the first virtual object interacts with the virtual environment. The two-dimensional visual representation refers to a picture display diagram of the virtual object. The picture display diagram may be displayed on the user interface of the client.

In the embodiments of the present disclosure, when obtaining the visible boundary scope, the client may process the three-dimensional visual representation, and obtain the two-dimensional visual representation in the virtual environment by the processing of the three-dimensional visual representation.

Obtain, from the two-dimensional visual representation of the virtual environment, coordinates of feature points of the visible boundary scope within the virtual environment.

The feature points are configured to indicate a specific scope of the visible boundary scope. The feature points may be boundary points of the visible boundary scope, e.g., vertexes of the visible boundary scope. It should be noted that, the number of the feature points may be any value, which are not limited by the embodiments of the present disclosure.

After obtaining foregoing two-dimensional visual representation of the virtual environment, the client may obtain, from the two-dimensional visual representation, coordinates of feature points of visible boundary scope within the virtual environment, and then, obtain the visible boundary scope. In the embodiments of the present disclosure, the client may obtain, based on parameters of the virtual camera, the coordinates of feature points of the visible boundary scope within the virtual environment. The parameters include a location parameter and a rotation parameter. The location parameter is configured to determine the location of the virtual camera in the virtual environment. The rotation parameter is configured to determine a shooting angle value of the virtual camera in the virtual environment. The client may obtain the shooting angle value of the virtual camera, based on the rotation angle and shooting angle of the virtual camera.

It should be noted that, in the embodiments of the present disclosure, since a different client corresponds to a different screen, the client may adjust, based on screen parameters, parameters of the virtual camera, obtain the location parameter and rotation parameter of the virtual camera by the process of the adjustments. And then, the client obtains, based on the location parameter and rotation parameter, the coordinates of feature points of the visible boundary scope within the virtual environment, such that the display screen of the virtual environment obtained by the virtual camera is matched with the user interface of the client. The screen parameters include a screen size and a screen resolution, that is, the client may adaptively adjust the location parameter and rotation parameter of the virtual camera, based on the screen size and screen resolution. Subsequently, the display screen of the virtual environment obtained by the virtual camera may adapt to the screen size and screen resolution of the client.

Obtain, based on the coordinates of feature points in the virtual environment, the visible boundary scope.

After obtaining foregoing coordinates of feature points in the virtual environment, the client may obtain, based on the coordinates of feature points in the virtual environment, the visible boundary scope. For example, according to the shape of the visible boundary scope, the client may connect the feature points, and obtain foregoing visible boundary scope.

Figure 7:
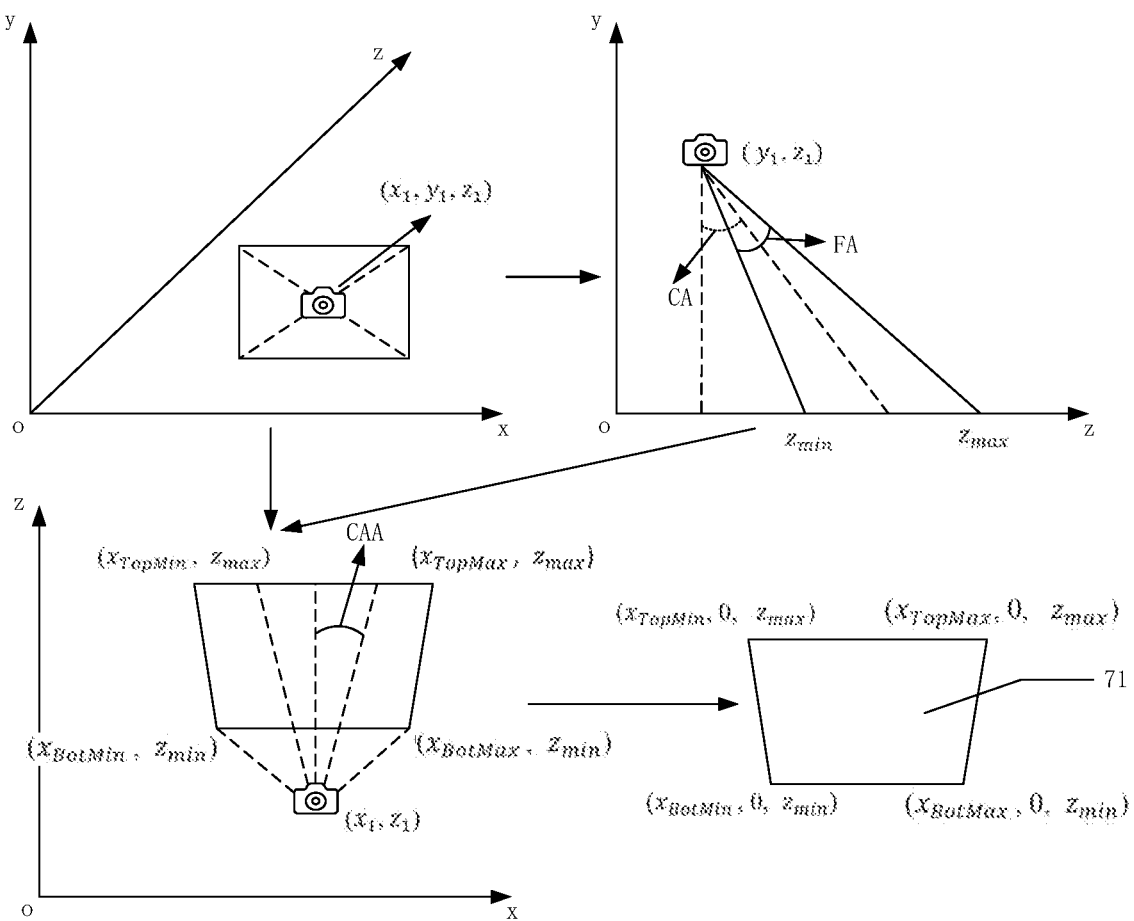
FIG. 7 is a schematic diagram illustrating how to obtain a visible boundary scope, in accordance with one or more embodiments of the present disclosure.

Exemplarily, assume that the virtual environment includes a three-dimensional coordinate system, the x-axis and y-axis of the three-dimensional coordinate system are parallel to the parallel plane of the virtual environment. The angle between the x-axis and the y-axis is 90°. The z-axis is perpendicular to the parallel plane of the virtual environment. The x-axis, y-axis and z-axis intersect at a point O. Subsequently, the location of the virtual camera in the virtual environment is shown in FIG. 7. The coordinates of the virtual camera are $(x_1, y_1, z_1)$. From the y-axis and z-axis, the value range $z_{min}$~$z_{max}$ of z-axis in the visible boundary scope is obtained. As shown in FIG. 7, the rotation angle of the virtual camera on the x-axis is CA, and the shooting angle is FA. The client may determine the rotation angle value of the virtual camera is CA-FA/2~CA+FA/2, based on the rotation angle CA and the shooting angle FA. Furthermore, the value range $z_{min}$~$z_{max}$ of z-axis in the visible boundary scope is:

$$z_{min} = z_1 + y_1 * \tan(CA - FA/2);$$

$$z_{max} = z_1 + y_1 * \tan(CA + FA/2);$$

Furthermore, from the x-axis and z-axis, the client obtains the vertex coordinates $(x_{TopMin}, z_{max})$, $(x_{TopMax}, z_{max})$, $(x_{BotMin}, z_{min})$, $(x_{BotMax}, z_{min})$ of the visible boundary scope. $(x_{TopMin}, z_{max})$ is the upper left vertex of the visible boundary scope. $(x_{TopMax}, z_{max})$ is the upper right vertex of the visible boundary scope. $(x_{BotMin}, z_{min})$ is the bottom left vertex of the visible boundary scope. $(x_{BotMax}, z_{min})$ is the bottom right vertex of the visible boundary scope. According to geometric principles, it can be seen that xTopMin, xTopMax, $x_{BotMin}$ and $x_{BotMax}$ are respectively as follows:

$$x_{TopMin} = x_1 - \left(\frac{y_1 / \sin\left(CA - \frac{FA}{2}\right)}{\tan(CAA)}\right);$$

$$x_{TopMax} = x_1 + \left(\frac{y_1 / \sin\left(CA - \frac{FA}{2}\right)}{\tan(CAA)}\right);$$

$$x_{BotMin} = x_1 - \left(\frac{y_1 / \sin\left(CA + \frac{FA}{2}\right)}{\tan(CAA)}\right);$$

$$x_{BotMax} = x_1 + \left(\frac{y_1 / \sin\left(CA + \frac{FA}{2}\right)}{\tan(CAA)}\right);$$

CAA refers to the horizontal opening angle of the virtual camera.

Since the virtual environment is displayed on the user interface in the form of two-dimensional visual representation, and the y-axis is perpendicular to the screen inward in the actual coordinate direction of the client, in the two-dimensional visual representation, vertex coordinates of the visible boundary scope are $(x_{TopMin}, 0, z_{max})$, $(x_{TopMax}, 0, z_{max})$, $(x_{BotMin}, 0, z_{min})$ and $(x_{BotMax}, 0, z_{min})$. After obtaining the vertex coordinates $(x_{TopMin}, 0, z_{max})$, $(x_{TopMax}, 0, z_{max})$, $(x_{BotMin}, 0, z_{min})$ and $(x_{BotMax}, 0, z_{min})$, the client may connect these vertex coordinates, and then obtain foregoing visible boundary scope. At this time, the visible boundary scope is a trapezoidal scope 71.

It should be noted that, foregoing block of obtaining the visible boundary scope may be performed by a certain computer program module in an application. The computer program module may exist as a plug-in in the application, such as a screen margin filter.

Figure 8:
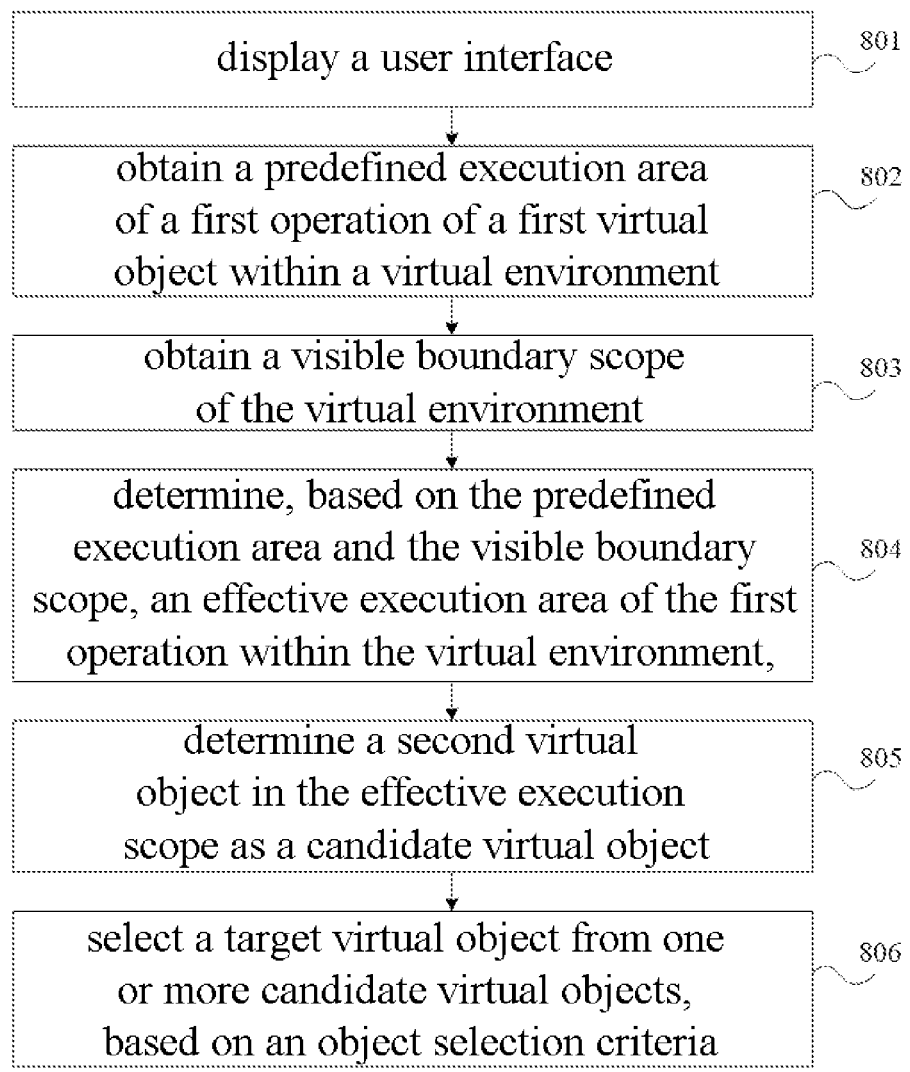
FIG. 8 is a schematic flowchart illustrating a method for selecting a virtual object on a user interface of a terminal, in accordance with one or more embodiments of the present disclosure.

FIG. 8 is a flowchart illustrating a method for selecting a virtual object on a user interface of a terminal, in accordance with another embodiment of the present disclosure. The method may be applied to the terminal, e.g., the execution entity of each block may be the terminal 10 (referred to as "client" in the following) in the application running environment shown in FIG. 1. The method may include several blocks (801~806) as follows.

In block 801, display a user interface.

In block 802, obtain a predefined execution area of a first operation of a first virtual object within a virtual environment.

In block 803, obtain a visible boundary scope of the virtual environment.

In block 804, determine, based on the predefined execution area and the visible boundary scope, an effective execution area of the first operation in the virtual environment.

Foregoing blocks 801-804 are the same as blocks 301-304 in the embodiment illustrated with FIG. 3, contents corresponding to the embodiment illustrated with FIG. 3 are not repeated here.

In block 805, determine a second virtual object in the effective execution area as a candidate virtual object.

The second virtual object refers to a virtual object controlled by the user, or another user in the application. The candidate virtual object refers to a candidate action target of foregoing first operation. After obtaining foregoing effective execution area, the client may take a virtual object in the effective execution area as the second virtual object. The second virtual object includes a virtual object in the same camp with the first virtual object, and may also include a virtual object in a different camp with the first virtual object.

In certain embodiments, after obtaining foregoing effective execution area, the client may compare coordinates of boundary points of the effective execution area with location coordinates of the virtual object, and then, obtain the second virtual object in the effective execution area.

In certain embodiments, in order to reduce processing overheads of a terminal, the client may directly determine the second virtual object in the effective execution area, based on the predefined execution area and the visible boundary scope. After obtaining the predefined execution area, the client may obtain the second virtual object in the predefined execution area, and obtain the location information of the second virtual object. Furthermore, the client determines whether the second virtual object meets a requirement, based on the location information. The requirement is a judgment requirement used to determine whether the second virtual object is within the effective execution area. If the location information of the second virtual object meets the requirement, the second virtual object is located within the effective execution area. If the location information of the second virtual object does not meet the requirement, the second virtual object is not located within the effective execution area.

Foregoing requirement may include a first requirement and a second requirement. The visible boundary scope is a trapezoidal area enclosed by a first edge, a second edge, a third edge and a fourth edge. Meanwhile, the first edge is parallel to the third edge. After obtaining the location information of the second virtual object within the predefined execution area, the client may analyze and detect the location information. If the location information of foregoing second virtual object is located between the first edge and the third edge, the client determines that the second virtual object meets the first requirement. If the location information of foregoing second virtual object is located between the second edge and the fourth edge, the client determines that the second virtual object meets the second requirement. When the second virtual object meets the first requirement and the second requirement, the client determines that the second virtual object is located within the effective execution area.

Exemplarily, in conjunction with FIG. 7, the visible boundary scope is a trapezoidal scope 71. Vertex coordinates of the trapezoidal scope are $(x_{TopMin}, 0, z_{max})$, $(x_{TopMax}, 0, z_{max})$, $(z_{BotMin}, 0, z_{min})$ and $(x_{BotMax}, 0, z_{min})$. Assume that the coordinates of the second virtual object are $(h_x, h_y, h_z)$, foregoing first requirement is:

$$z_{min} < h_z < z_{max}.$$

If the location information of the second virtual object meets foregoing first requirement, it is determined that the second virtual object is located between mutually paralleled first edge and third edge in the trapezoidal scope 71.

Foregoing second requirement is:

$$h_x - x_{BotMax} - \left(\frac{(z_{max} - z_{min})}{(x_{TopMax} - x_{BotMax})}\right) * (h_y - z_{min}) > 0;$$

$$h_x - x_{BotMin} - \left(\frac{(z_{max} - z_{min})}{(x_{TopMin} - x_{BotMin})}\right) * (h_y - z_{min}) < 0;$$

If the location information of the second virtual object meets foregoing second requirement, it is determined that the second virtual object is located between the second edge and fourth edge in the trapezoidal scope 71.

When the location information of the second virtual object meets the first and second requirements, it is determined that the second virtual object is located within the effective execution area.

The client may select at least one candidate virtual object from multiple second virtual objects, based on operation attributes of foregoing first operation. The operation attributes include an attack attribute and a gain attribute. The attack attribute refers to that foregoing first operation may reduce the attribute value of other virtual objects. The gain attribute refers to that foregoing first operation may increase the attribute value of other virtual objects. Foregoing attribute value may include a life value, a defense value, or an attack speed, etc., which are not limited by the embodiments of the present disclosure. If foregoing first operation is identified as an attack operation, the client identifies a virtual object, which belongs to a different camp from the first virtual object, in the effective execution area as the candidate virtual objects. If foregoing first operation is identified as a gain operation, the client identifies a virtual object, which belongs to the same camp with the first virtual object, in the effective execution area as the candidate virtual objects.

In block 806, select a target virtual object from one or more candidate virtual objects, based on an object selection criteria.

The object selection criteria refers to a selection method of an action target corresponding to the first operation. The object selection criteria includes an action scope of the first operation and a target selection index. The action scope of the first operation is configured to indicate an effect scope of foregoing first operation. The effect scope may be represented by a scope with a certain area and shape, or by the number of target virtual objects. The target selection index is configured to indicate a selection criteria of the target virtual object. The selection criteria may be an attribute value of the second virtual object. For example, the selection criteria is a life value of the second virtual object. Subsequently, the client may select a second candidate virtual object with the smallest life value in the effective execution area as the target virtual object.

In the embodiments of the present disclosure, after obtaining foregoing at least one candidate virtual object, the client may select the target virtual object from the at least one candidate virtual object, based on the object selection criteria of the first operation. A different operation corresponds to a different object selection criteria.

It should be noted that, foregoing object selection criteria may be a rule preset by a designer, and may also be a rule that is flexibly changed this time according to certain embodiments of the present disclosure. For example, the preset rule may change, based on an interactive operation or attribute value of the first virtual object. For example, when the usage count of the first operation of the first virtual object is different, foregoing object selection criteria may be different. For another example, when the attack power of the first virtual object is different, foregoing object selection criteria may be different, which is not limited by the embodiments of the present disclosure.

In view of above, in the technical solutions provided by the embodiments of the present disclosure, the target virtual object corresponding to the first operation is selected from the effective execution area, thereby improving the accuracy for selecting the target virtual object on a user interface of a terminal. The target virtual object is selected based on the object selection criteria, thereby the selection of the target virtual object is more flexible.

In addition, a different target virtual object is determined, based on different effects of the first operation, such that the selection of the target virtual object is more flexible.

Figure 9:
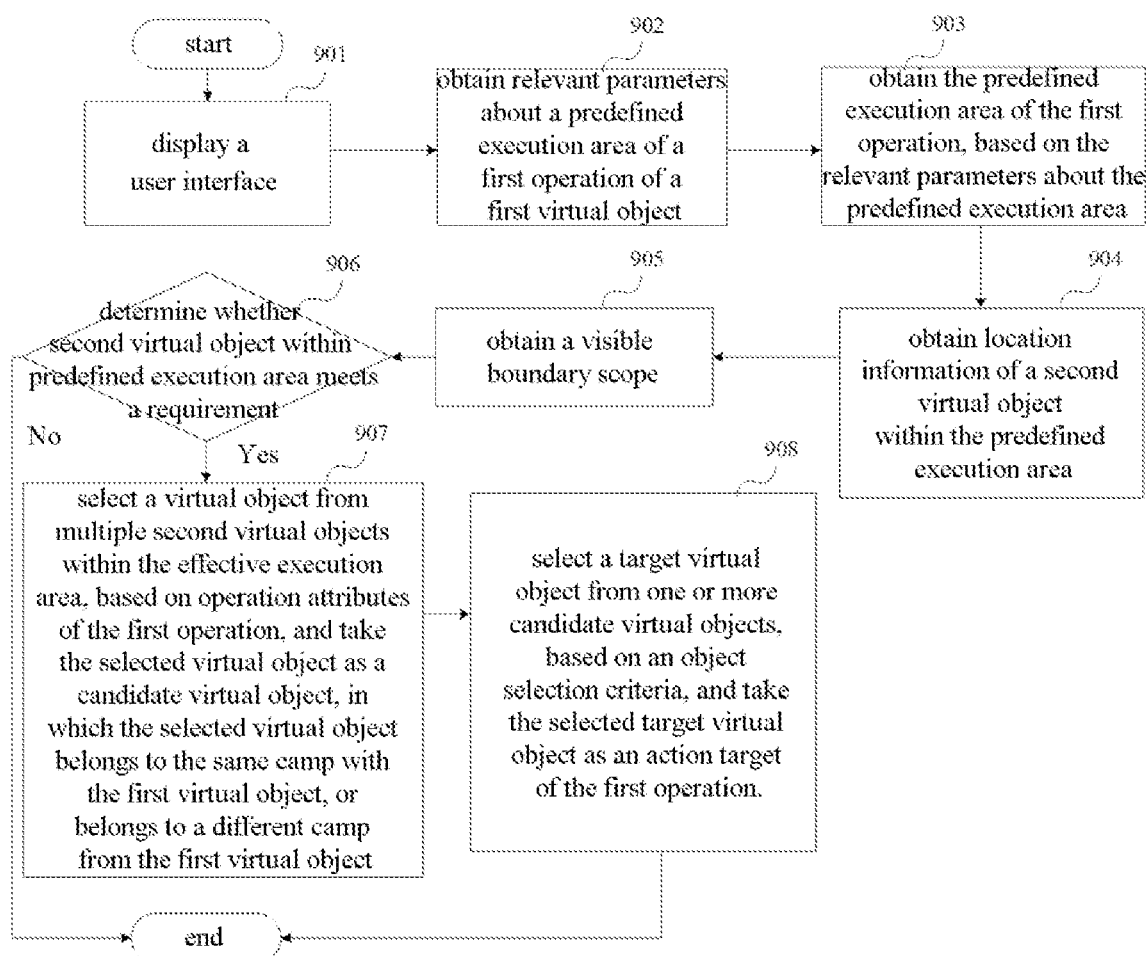
FIG. 9 is a schematic diagram illustrating a method for selecting a virtual object on a user interface of a terminal, in accordance with one or more embodiments of the present disclosure.

In addition, in conjunction with FIG. 9, an introduction to the application is provided.

In block 901, a client displays a user interface.

In block 902, the client obtains relevant parameters about a predefined execution area of a first operation of a first virtual object, in which the relevant parameters of the predefined execution area include location information of the first virtual object and a predefined execution distance of the first operation.

In block 903, the client obtains the predefined execution area of the first operation, based on the relevant parameters of the predefined execution area.

In block 904, the client obtains location information of a second virtual object within the predefined execution area.

In block 905, the client obtains a visible boundary scope.

In block 906, the client determines whether the second virtual object that resides in the predefined execution area meets a requirement. If the second virtual object that reside in the predefined execution area meets the requirement, the client determines that the second virtual object is located in an effective execution area, and executes block 907. If the second virtual object that resides in the predefined execution area does not meet the requirement, the client determines that the second virtual object is not located within the effective execution area, and terminates the process.

In block 907, the client selects a virtual object from multiple second virtual objects within the effective execution area, based on operation attributes of the first operation, and takes the selected virtual object as a candidate virtual object, in which the selected virtual object belongs to the same camp with the first virtual object, or belongs to a different camp from the first virtual object.

In block 908, the client selects a target virtual object from one or more candidate virtual objects, based on an object selection criteria, and takes the selected target virtual object as an action target of the first operation.

The following are apparatus embodiments of the present disclosure, which may be configured to execute method embodiments of the present disclosure. Details not disclosed in the apparatus embodiments of the present disclosure, may be found in method embodiments of the present disclosure.

Figure 10:
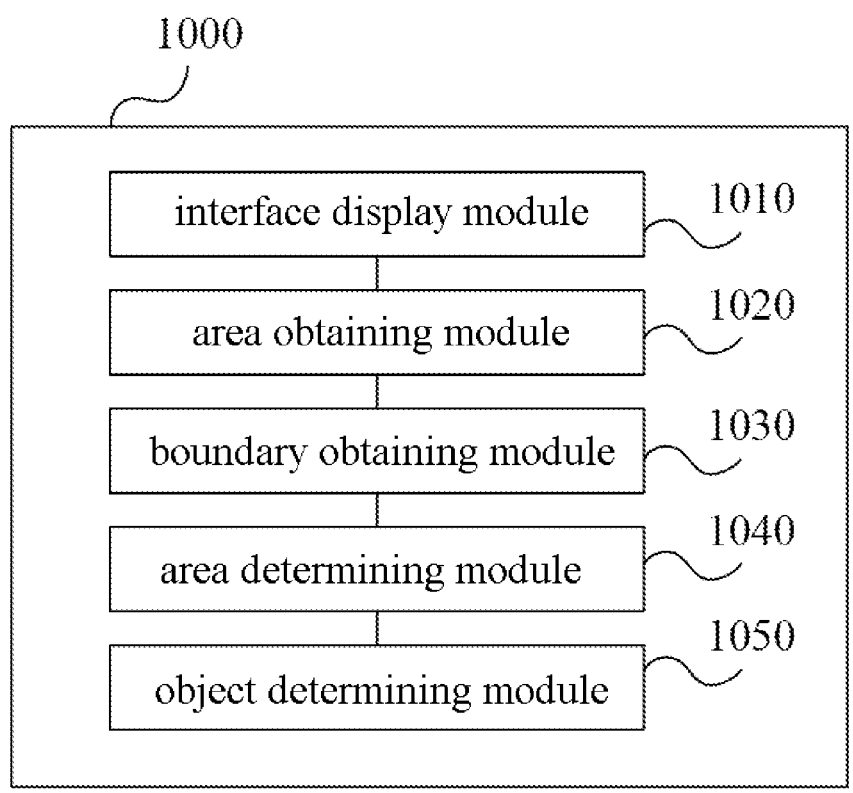
FIG. 10 is a schematic block diagram of an apparatus for selecting a virtual object on a user interface of a terminal, in accordance with one or more embodiments of the present disclosure.

FIG. 10 is a block diagram of an apparatus for selecting a virtual object on a user interface of a terminal, in accordance with an embodiment of the present disclosure. The apparatus has the function of realizing the selection method of above virtual object. Such function may be implemented by hardware, and may also be implemented by hardware executing corresponding software. The apparatus may be the terminal, and may also be set in the terminal. An apparatus 1000 may include an interface display module 1010, an area obtaining module 1020, a boundary obtaining module 1030, an area determining module 1040 and an object determining module 1050.

The interface display module 1010 is configured to display a user interface. The user interface includes a display screen corresponding to a virtual environment, and further includes a first virtual object located in the virtual environment.

The area obtaining module 1020 is configured to obtain a predefined execution area of a first operation of the first virtual object within the virtual environment.

The boundary obtaining module 1030 is configured to obtain a visible boundary scope of the virtual environment. Virtual objects that reside in the visible boundary scope are visible on the user interface.

The area determining module 1040 is configured to determine, based on the predefined execution area and the visible boundary scope, an effective execution area of the first operation within the virtual environment.

The object determining module 1050 is configured to determine, based on the effective execution area, a target virtual object.

In an exemplary embodiment, the boundary obtaining module 1030 includes a two-dimensional obtaining unit 1031, a coordinate obtaining unit 1032 and a boundary obtaining unit 1033.

The two-dimensional obtaining unit 1031 is configured to process a three-dimensional visual representation in the virtual environment, and obtain a two-dimensional visual representation of the virtual environment by the processing of the three-dimensional visual representation.

The coordinate obtaining unit 1032 is configured to obtain, from the two-dimensional visual representation of the virtual environment, coordinates of feature points of the visible boundary scope within the virtual environment.

The boundary obtaining unit 1033 is configured to obtain, based on the coordinates of the feature points in the virtual environment, the visible boundary scope.

In an exemplary embodiment, the boundary obtaining unit 1033 includes a coordinate obtaining subunit.

The coordinate obtaining subunit is configured to obtain, based on parameters of a virtual camera, coordinates of the feature points of the visible boundary scope within the virtual environment. The parameters include a location parameter and a rotation parameter. The location parameter is configured to determine the location of the virtual camera in the virtual environment. The rotation parameter is configured to determine a shooting angle value of the virtual camera in the virtual environment.

In an exemplary embodiment, the coordinate obtaining subunit is configured to adjust, based on screen parameters, the parameters of the virtual camera, and obtain the location parameter and the rotation parameter of the virtual camera, by the process of the adjustments. The screen parameters include parameters of screen size and screen resolution. The coordinate obtaining subunit is configured to obtain, based on the location parameter and the rotation parameter, the coordinates of the feature points of the visible boundary scope within the virtual environment.

In an exemplary embodiment, the area obtaining module 1020 is configured to obtain the location information of the first virtual object in the virtual environment, and determine, based on the location information and the predefined execution distance of the first operation, the predefined execution area of the first operation in the virtual environment.

In an exemplary embodiment, the object determining module 1050 includes a candidate determining unit 1051 and a target determining unit 1052.

The candidate determining unit 1051 is configured to determine a second virtual object within the effective execution area as a candidate virtual object.

The target determining unit 1052 is configured to select the target virtual object from one or more candidate virtual objects, based on an object selection criteria.

Figure 11:
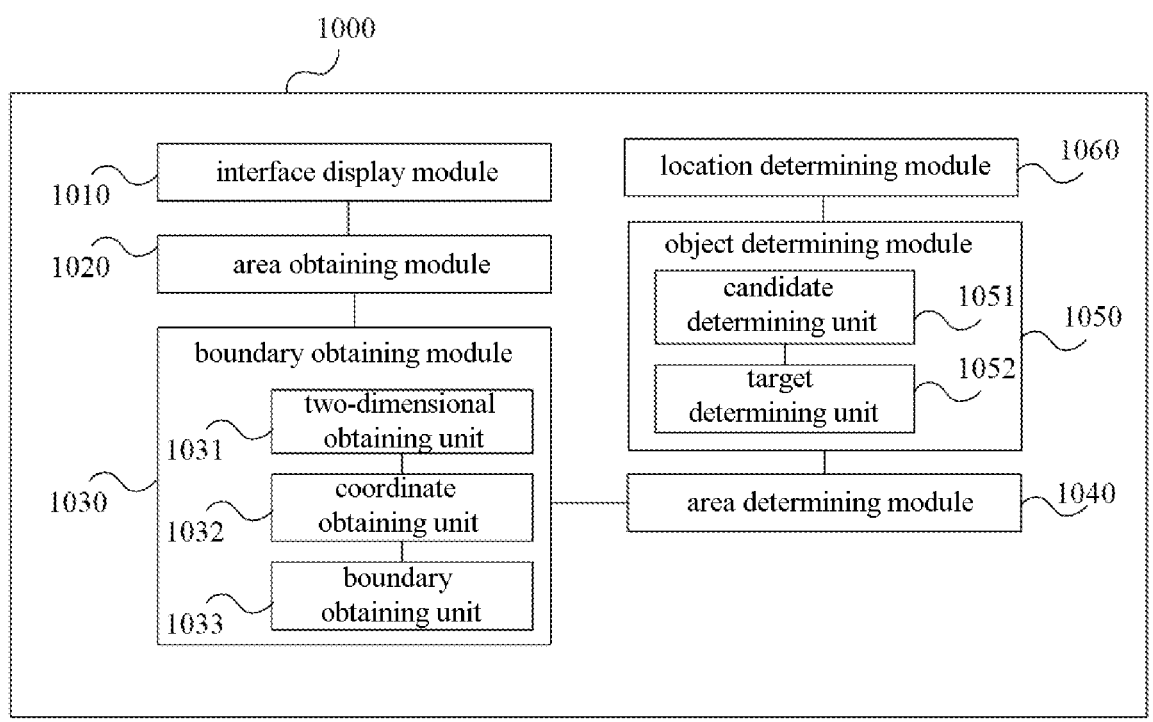
FIG. 11 is a schematic block diagram of an apparatus for selecting a virtual object on a user interface of a terminal, in accordance with one or more embodiments of the present disclosure.

In an exemplary embodiment, the visible boundary scope is a trapezoidal area enclosed by a first edge, a second edge, a third edge and a fourth edge. The first edge is parallel to the third edge. As shown in FIG. 11, the apparatus 1000 further includes a location determining module 1060.

The location determining module 1060 is configured to obtain location information of the second virtual object in the predefined execution area. When the location information of the second virtual object is located between the first edge and the third edge, the location determining module 1060 is configured to determine that the second virtual object meets a first requirement. When the location information of the second virtual object is located between the second edge and the fourth edge, the location determining module 1060 is configured to determine that the second virtual object meets a second requirement. When the second virtual object meets the first requirement and the second requirement, the location determining module 1060 is configured to determine that the second virtual object is located in the effective execution area.

In an exemplary embodiment, when the first operation is identified as an attack operation, the candidate determining unit 1051 is configured to determine a virtual object, which belongs to a different camp from the first virtual object, in the effective execution area as the candidate virtual object. Alternatively, when the first operation is identified as a gain operation, the candidate determining unit 1051 is configured to determine a virtual object, which belongs to the same camp as the first virtual object, in the effective execution area as the candidate virtual object.

In view of above, in the technical solutions provided by the embodiments of the present disclosure, the effective execution area of the first operation is determined, based on the predefined execution area of the first operation and the visible boundary scope of the virtual environment. The target virtual object corresponding to the first operation is determined, based on the effective execution area. Subsequently, the target virtual object is located within the visible boundary scope, thereby ensuring that the action target of the first operation is located within the visible scope of the user, avoiding an operation misjudgment resulted from the following scene, i.e., the action target is located in the invisible scope of the user, and improving the accuracy for selecting the action target of the first operation.

It should be noted that, for the apparatus provided by foregoing embodiment, when implementing functions thereof, only the division of foregoing functional modules is taken as an example. In practical implementations, foregoing functions may be allocated to different functional modules to be performed, as may be desirable. That is, an internal structure of the device is divided into different functional modules, so as to complete all of or some functions described above. In addition, the apparatus provided by foregoing embodiments and method embodiments belong to the same concept. The specific implementation process may refer to method embodiments, which are not repeated here.

Figure 12:
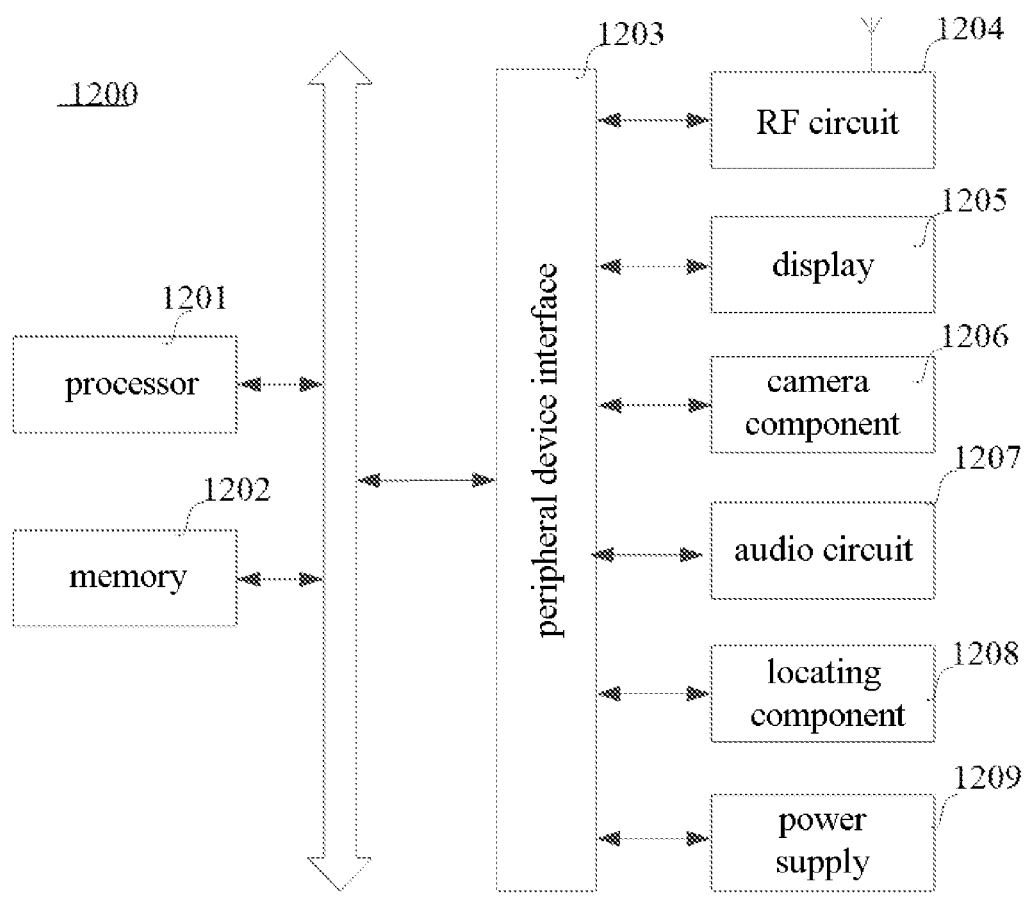
FIG. 12 is a schematic block diagram illustrating structure of a terminal, in accordance with one or more embodiments of the present disclosure.

FIG. 12 is a block diagram illustrating structure of a terminal 1200, in accordance with an embodiment of the present disclosure. The terminal 1200 may be an electronic device, such as a mobile phone, a tablet computer, a game host, an ebook reader, a multimedia playback device, a wearable device and a Personal Computer (PC). The terminal is configured to implement the method for selecting a virtual object provided by foregoing embodiment. The terminal may be the terminal 10 in the game running environment illustrated with FIG. 1.

Generally, the terminal 1200 includes a processor 1201 and a memory 1202.

The processor 1201 may include one or more processing core, e.g., a 4-core processor, a 8-core processor, and so on. The processor 1201 may be implemented by at least one hardware form, e.g., Digital Signal Processing (DSP), Field Programmable Gate Array (FPGA), Programmable Logic Array (PLA). The processor 1201 may also include a main processor and a coprocessor. The main processor is a processor in charge of processing data in awake state, which may also be referred to as a Central Processing Unit (CPU). The coprocessor is a low-power processor configured to process data in the standby state. In some embodiments, the processor 1201 may be integrated with a Graphics Processing Unit (GPU). The GPU is configured to render and draw contents to be displayed on the display. In some embodiments, the processor 1201 may also include an Artificial Intelligence (AI) processor. The AI processor is configured to process computing operations related with machine learning.

The memory 1202 may include one or more computer readable storage medium. The computer readable storage medium may be non-transitory. The memory 1202 may also include a high-speed Random Access Memory (RAM), and a non-transitory memory, e.g., one or more disk storage device, flash storage device. In some embodiments, the non-transitory computer readable storage medium in the memory 1202 is configured to store at least one instruction, at least one program, code set or instruction set, in which the at least one instruction, at least one program, code set or instruction set are configured and processed by one or more processor, so as to implement foregoing method for selecting a virtual object.

In some embodiments, the terminal 1200 may also include a peripheral device interface 1203 and at least one peripheral device. The processor 1201, the memory 1202 and the peripheral device interface 1203 may be connected through a bus or signal line. Each peripheral device may be connected with the peripheral device interface 1203 through the bus, the signal line or a circuit board. In certain embodiments, the peripheral device includes at least one of a Radio Frequency (RF) circuit, a display (e.g., a touch screen) 1205, a camera component 1206, an audio circuit 1207, a locating component 1208, a power supply 1209.

Persons having ordinary skill in the art may understand that, the structure shown in FIG. 12 does not limit the terminal 1200. The terminal 1200 may include more or less components compared with that shown in FIG. 12, or combine some components, or adopt a different component layout.

In an exemplary embodiment, a computer readable storage medium is also provided. The storage medium stores at least one instruction, at least one program, code set or instruction set, in which when the at least one instruction, the at least one program, the code set or instruction set are executed by the processor, the method for selecting a virtual object is implemented.

The computer readable storage medium may include a Read Only Memory (ROM), a Random Access Memory (RAM), a Solid State Drives (SSD) or a Compact Disk (CD), and so on. The RAM may include a Resistance Random Access Memory (ReRAM) and a Dynamic Random Access Memory (DRAM).

In an exemplary embodiment, a computer program product is also provided. When the computer program product is executed by the processor, foregoing method for selecting a virtual object is achieved.

The term unit (and other similar terms such as subunit, module, submodule, etc.) in this disclosure may refer to a software unit, a hardware unit, or a combination thereof. A software unit (e.g., computer program) may be developed using a computer programming language. A hardware unit may be implemented using processing circuitry and/or memory. Each unit can be implemented using one or more processors (or processors and memory). Likewise, a processor (or processors and memory) can be used to implement one or more units. Moreover, each unit can be part of an overall unit that includes the functionalities of the unit.

It should be understood that, "multiple" mentioned in the present disclosure refers to two or more. "And/or" describes an associated relationship of associated objects, which indicates that there may be three relationships, e.g., A and/or B may indicate three situations, A exists independently, A and B simultaneously exist, B exists independently. The character "/" generally represents that there is a "or" relationship between the former and subsequent associated objects. In addition, the block numbers described in the present disclosure only exemplarily illustrate one possible execution order among blocks. In some other embodiments, foregoing blocks may be performed not according to the sequence of the numbers, e.g., two blocks with different numbers are performed simultaneously, or two blocks with different numbers are performed according to an inverse order illustrated in the figure, which are not limited by the embodiments of the present disclosure.

The foregoing are only exemplary embodiments of the present disclosure, which are not for use in limiting the present disclosure. Any modifications, equivalent substitutions, or improvements made within the spirit and principle of the present disclosure should be covered by the protection scope of the present disclosure.

What is claimed is:

1. A method for selecting a virtual object on a user interface of a terminal, performed by the terminal, the method comprising:

displaying the user interface, wherein the user interface includes a display screen corresponding to a virtual environment, and further includes a first virtual object located in the virtual environment;

obtaining a predefined execution area of a first operation of the first virtual object within the virtual environment;

obtaining a visible boundary scope of the virtual environment, wherein virtual objects that reside in the visible boundary scope are visible on the user interface;

in response to that a part of the predefined execution area exists outside the visible boundary scope, determining an intersection area of the predefined execution area and the visible boundary scope as an effective execution area of the first operation within the virtual environment; and determining, based on the effective execution area, a target virtual object.

2. The method according to claim 1, wherein obtaining the visible boundary scope comprises:

processing a three-dimensional visual representation of the virtual environment;

obtaining a two-dimensional visual representation of the virtual environment by the processing of the three-dimensional visual representation;

obtaining, from the two-dimensional visual representation, the coordinates of feature points of the visible boundary scope within the virtual environment; and obtaining, based on the coordinates of the feature points, the visible boundary scope.

3. The method according to claim 2, wherein obtaining the coordinates of the feature points comprises:

obtaining, based on parameters of a virtual camera, coordinates of the feature points of the visible boundary scope within the virtual environment;

wherein the parameters include a location parameter and a rotation parameter, the location parameter is configured to determine the location of the virtual camera in the virtual environment, the rotation parameter is configured to determine a shooting angle value of the virtual camera in the virtual environment.

4. The method according to claim 3, wherein obtaining the coordinates of the feature points comprises:

adjusting, based on screen parameters, the parameters of the virtual camera;

obtaining the location parameter and the rotation parameter of the virtual camera, by the process of the adjustments, wherein the screen parameters include parameters of screen size and screen resolution; and obtaining, based on the location parameter and the rotation parameter, the coordinates of the feature points of the visible boundary scope within the virtual environment.

5. The method according to claim 1, wherein obtaining the predefined execution area comprises:

obtaining the location information of the first virtual object within the virtual environment; and, determining, based on the location information and a predefined execution distance of the first operation, the predefined execution area of the first operation in the virtual environment.

6. The method according to claim 1, wherein determining the target virtual object comprises:

determining a second virtual object within the effective execution area as a candidate virtual object;

selecting the target virtual object from one or more candidate virtual object based on an object selection criteria.

7. The method according to claim 6, wherein the visible boundary scope is a trapezoidal area enclosed by a first edge, a second edge, a third edge and a fourth edge, the first edge is parallel to the third edge, and the method further comprises:

obtaining the location information of the second virtual object in the predefined execution area;

when the location information of the second virtual object is located between the first edge and the third edge, determining that the second virtual object meets a first requirement;

when the location information of the second virtual object is between the second edge and the fourth edge, determining that the second virtual object meets a second requirement; and when the second virtual object meets the first requirement and the second requirement, determining that the second virtual object is located in the effective execution area.

8. The method according to claim 6, wherein determining the second virtual object comprises:

when the first operation is identified as an attack operation, identifying a virtual object, which belongs to a different camp from the first virtual object, in the effective execution area as the candidate virtual object.

9. The method according to claim 6, wherein determining the second virtual object comprises:

when the first operation is identified as a gain operation, identifying a virtual object which belongs to the same camp with the first virtual object, in the effective execution area as the candidate virtual object.

10. The method according to claim 1, wherein: a virtual camera on the virtual environment corresponds to the display screen;

the visible boundary scope of the virtual environment is obtained based on coordinates of feature points; and the coordinates of feature points are determined by location parameter and rotation parameter of the virtual camera.

11. The method according to claim 1, further comprising:

determining, based on a rotation angle of the virtual camera and a shooting angle of the virtual camera, a rotation angle value of the virtual camera, wherein the rotation angle of the virtual camera and the shooting angle of virtual camera correspond to a coordinate on an x-axis of the virtual environment.

12. An apparatus for selecting a virtual object on a user interface of a terminal, the apparatus comprising: a memory storing computer program instructions; and a processor coupled to the memory and configured to execute the computer program instructions and perform:
   displaying the user interface, wherein the user interface includes a display screen corresponding to a virtual environment, and further includes a first virtual object located in the virtual environment;
   obtaining a predefined execution area of a first operation of the first virtual object within the virtual environment;
   obtaining a visible boundary scope of the virtual environment, wherein virtual objects that reside in the visible boundary scope are visible on the user interface;
   in response to that a part of the predefined execution area exists outside the visible boundary scope, determining an intersection area of the predefined execution area and the visible boundary scope as an effective execution area of the first operation within the virtual environment; and
   determining, based on the effective execution area, a target virtual object.

13. The apparatus according to claim 12, wherein the processor is further configured to execute the computer program instructions and perform:
   processing a three-dimensional visual representation of the virtual environment, obtain a two-dimensional visual representation of the virtual environment by the processing of the three-dimensional visual representation;
   obtaining, from the two-dimensional visual representation of the virtual environment, coordinates of feature points of the visible boundary scope within the virtual environment; and,
   obtaining, based on the coordinates of the feature points within the virtual environment, the visible boundary scope.

14. The apparatus according to claim 13, wherein the processor is further configured to execute the computer program instructions and perform:
   obtaining, based on parameters of a virtual camera, coordinates of the feature points of the visible boundary scope within the virtual environment;
   wherein the parameters include a location parameter and a rotation parameter, the location parameter is configured to determine the location of the virtual camera in the virtual environment, the rotation parameter is configured to determine a shooting angle value of the virtual camera in the virtual environment.

15. The apparatus according to claim 14, wherein obtaining the coordinates of the feature points comprises:
   adjusting, based on screen parameters, the parameters of the virtual camera;
   obtaining the location parameter and the rotation parameter of the virtual camera, by the process of the adjustments, wherein the screen parameters include parameters of screen size and screen resolution; and
   obtaining, based on the location parameter and the rotation parameter, the coordinates of the feature points of the visible boundary scope within the virtual environment.

16. The apparatus according to claim 12, wherein obtaining the predefined execution area comprises:
   obtaining the location information of the first virtual object within the virtual environment; and,
   determining, based on the location information and a predefined execution distance of the first operation, the predefined execution area of the first operation in the virtual environment.

17. The apparatus according to claim 12, wherein determining the target virtual object comprises:
   determining a second virtual object within the effective execution area as a candidate virtual object;
   selecting the target virtual object from one or more candidate virtual object based on an object selection criteria.

18. The apparatus according to claim 17, wherein the visible boundary scope is a trapezoidal area enclosed by a first edge, a second edge, a third edge and a fourth edge, the first edge is parallel to the third edge, and the processor is further configured to execute the computer program instructions and perform:
   obtaining the location information of the second virtual object in the predefined execution area;
   when the location information of the second virtual object is located between the first edge and the third edge, determining that the second virtual object meets a first requirement;
   when the location information of the second virtual object is between the second edge and the fourth edge, determining that the second virtual object meets a second requirement; and
   when the second virtual object meets the first requirement and the second requirement, determining that the second virtual object is located in the effective execution area.

19. The apparatus according to claim 17, wherein determining the second virtual object comprises:
   when the first operation is identified as an attack operation, identifying a virtual object, which belongs to a different camp from the first virtual object, in the effective execution area as the candidate virtual object.

20. A non-transitory computer-readable storage medium storing computer program instructions executable by at least one processor to perform:
   displaying a user interface of a terminal, wherein the user interface includes a display screen corresponding to a virtual environment, and further includes a first virtual object located in the virtual environment;
   obtaining a predefined execution area of a first operation of the first virtual object within the virtual environment;
   obtaining a visible boundary scope of the virtual environment, wherein virtual objects that reside in the visible boundary scope are visible on the user interface;
   in response to that a part of the predefined execution area exists outside the visible boundary scope, determining an intersection area of the predefined execution area and the visible boundary scope as an effective execution area of the first operation within the virtual environment; and
   determining, based on the effective execution area, a target virtual object.

* * * * *